(12) United States Patent
Furukoshi et al.

(10) Patent No.: US 6,280,095 B1
(45) Date of Patent: Aug. 28, 2001

(54) BEARING DEVICE

(75) Inventors: Akimi Furukoshi; Yutaka Daikuhara, both of Miyota-machi (JP); Mineo Oyama, Chatsworth, CA (US)

(73) Assignee: Minebea Co., Ltd., Kitasaku (JP)

( * ) Notice: Subject to any disclaimer, the term of this patent is extended or adjusted under 35 U.S.C. 154(b) by 0 days.

(21) Appl. No.: 09/497,481

(22) Filed: Feb. 4, 2000

(30) Foreign Application Priority Data

May 28, 1999 (JP) .................................................. 11-149741

(51) Int. Cl.[7] ...................................................... F16C 19/52
(52) U.S. Cl. .............................. 384/489; 384/493; 384/536
(58) Field of Search .................................... 384/489, 536, 384/582, 493, 557

(56) References Cited

U.S. PATENT DOCUMENTS 4,696,587 * 9/1987 Nishida et al. .

5,975,764 * 11/1999 Okada et al. .

* cited by examiner

*Primary Examiner*—Lenard A. Footland
(74) *Attorney, Agent, or Firm*—Oliff & Berridge, PLC

(57) ABSTRACT

The present invention provides a bearing device reliable of shielding any material or fluid from moving between a fluid passage within a fluid system housing and an outside of the housing. In the above bearing device, a roller bearing (12) equipped with sealing plates (17) is fitted into a coupling bore (11) in an intake pipe (1) serving as the housing so that the roller bearing (12) can bear a shaft (6) of a butterfly valve disposed in a fluid passage (2) within the intake pipe (1). The outer race (13) and the inner race (14) of the roller bearing (12) are formed with annular grooves (21, 22), respectively, and O-rings (23, 24) are engagingly arranged on the interior of the annular grooves (21, 22), respectively. With the bearing device having this structure, the O-rings (23, 24) can prevent air, etc. from permeating into the intake passage (2) even though clearance (a, b) occurs in the engaged sections due to a dimensional error, difference in thermal expansion, etc.

4 Claims, 2 Drawing Sheets

BEARING DEVICE

BACKGROUND OF THE INVENTION

1. Field of the Invention

The present invention generally relates to a bearing device to be mounted in various fluid systems, and more specifically to a bearing device for bearing a rolling element arranged in a fluid passage within a fluid system housing.

2. Description of the Related Art

A vehicle engine carburetor used as a fluid system is exemplified in FIG. 2. In FIG. 2, the carburetor includes a venturi 3 in the middle of an intake passage 2 within an intake pipe 1. A nozzle 4 which is connected to a fuel chamber (float chamber) is mounted on the narrowest portion of the venturi 3, and is made open so that fuel may be injected from the nozzle 4 by making use of a negative pressure generated in the venturi 3 to form a mixture gas. Typically, a throttle valve 5 for controlling amount of supplying the mixture gas to the engine side is disposed at the downstream side of the venturi 3 in such a manner that the valve 5 can be rotated by means of a bearing device 10 as will be described later.

The bearing device 10 is so structured as in shown in FIG. 3. A roller bearing 12 is fitted into a coupling bore 11 formed in a wall portion of the intake pipe 1 which faces the diameter direction thereof, and a shaft 6 of the throttle valve 5 is supported by this roller bearing 12. As the roller bearing 12 used herein, a general-purpose bearing having a plurality of balls 16 held between an outer race 13 and an inner race 14 by a retainer 15 is chosen. Since air flow must be shielded, the bearing used therefor is formed with seals such that sealing plates 17, 17 are arranged at the both sides. The movement of an acceleration pedal (not shown) which exerts on one end of the shaft 6 via a lever 7 allows the throttle valve 5 to appropriately rotate.

Due to the structural design of the above-stated carburetor, the throttle valve 5 may be assembled concurrently while the shaft 6 is passed to the roller bearing 12. Therefore, the coupling bore 11 in the intake pipe 1 may not be tightly engaged with the roller bearing 12, and the roller bearing 12 may not be tightly engaged with the shaft 6 of the throttle valve 5. This potentially results in clearance a or b at the respective engaged sections due to a dimensional error. If the clearance a or b is formed, air as well as impurities such as water, oil or grease permeates through the clearance a or b into the intake passage 2 since the rotation of engine may also generate a negative pressure in the intake passage 2. This causes the engine performance to be deteriorated. Therefore, a sealing measure against this malfunction has been desired. Further, this type of carburetor is disposed in an engine room having a large variance of temperature, resulting in a difference in thermal expansion among the following three essential components of the bearing device 10: the intake pipe 1, the roller bearing 12, and the shaft 6 of the throttle valve 5. Then, the same clearance a or b as above may be possibly formed at these engaged sections. In view of this, the above-described sealing measure has also been desired.

The carburetor typically includes a choke valve for controlling the amount of intake gas at the upstream side of the venturi 3. A bearing device for bearing this choke valve also requires the above-described sealing measure.

Some of the vehicle engine fuel systems may include a fuel injection system in place of a carburetor. A bearing device for bearing a throttle valve mounted in this type of fuel injection system also requires the same sealing measure.

Further, some fluid systems may include a fluid passage in which a higher pressure is generated than atmospheric pressure. A bearing device for bearing a rolling element disposed in such a fluid passage requires a sealing measure to prevent the fluid in the fluid passage from leaking to the outside therefrom.

SUMMARY OF THE INVENTION

The present invention has been made in view of the conventional problems pointed out as above, and has an object to provide a bearing device with high sealing capability which is reliable of shielding any fluid or material from moving between the fluid passage within a fluid system housing and the outside of the housing.

In order to achieve the above object, the present invention provides a bearing device having a roller bearing equipped with seals which is fitted into a coupling bore in the wall of a fluid system housing, the fluid system having therein a fluid passage generating pressure difference between inside and outside of the housing, so that the roller bearing supports a shaft of a rolling element disposed in the fluid passage, wherein the roller bearing includes at least one annular groove in the outer circumferential surface of the outer race thereof and the inner circumferential surface of the inner race thereof, and a seal ring made of an elastic material is engagingly arranged on the interior of each of the at least one annular groove to attain sealing effect between the outer race and the inner surface of the coupling bore in the housing and between the inner race and the shaft of the rolling element.

With the thus constructed bearing device, any clearance that may occur in the engaged sections between the roller bearing and the housing and between the roller bearing and the shaft of the rolling element due to a dimensional error, difference in thermal expansion, etc. will be eliminated by a seal ring made of an elastic material. This closure shields any fluid or material from moving between the fluid passage within the housing and the outside of the housing.

According to the present invention, any particular kind or form of the fluid system housing and the rolling element disposed in the fluid passage within the housing may be available. An intake pipe for a vehicle engine and a butterfly valve may be chosen as the housing and the rolling element, respectively. In this case, the fluid passage within the housing is available for an intake passage and the butterfly valve is available for a throttle valve or a choke valve.

BRIEF DESCRIPTION OF THE DRAWINGS

Other features or advantages of the present invention will be apparent from the following detailed description taken in conjunction with the accompanying drawings, in which.

DETAILED DESCRIPTION OF THE PREFERRED EMBODIMENT

A description will be made of a preferred embodiment of the present invention with reference to the accompanying drawings.

Figure 1:
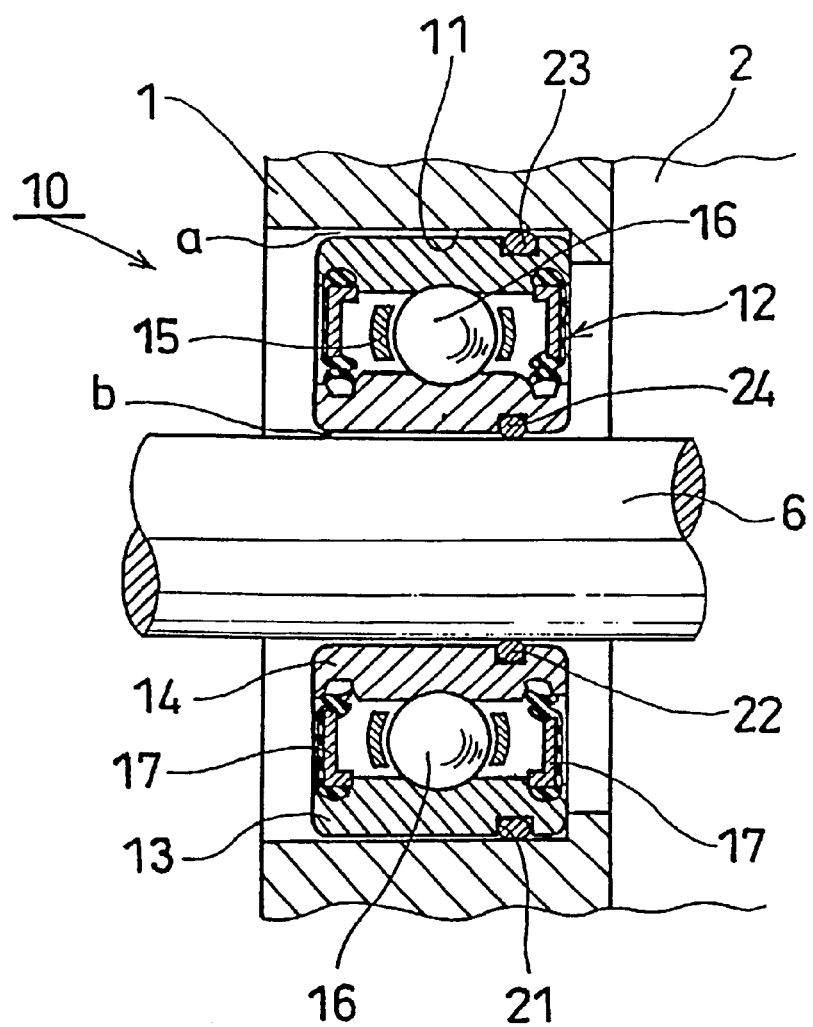
FIG. 1 is a sectional view showing the structure of a bearing device in accordance with the present invention.
Figure 2:
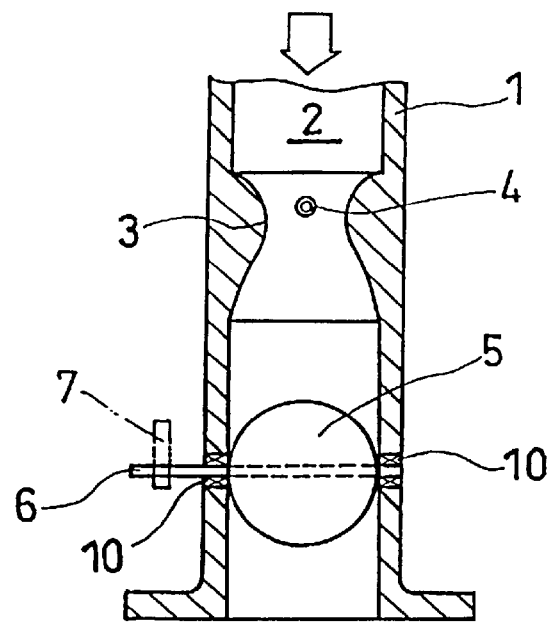
FIG. 2 is a sectional view schematically showing a general structure of a vehicle engine carburetor to which the bearing device in accordance with the present invention may be applied.
Figure 3:
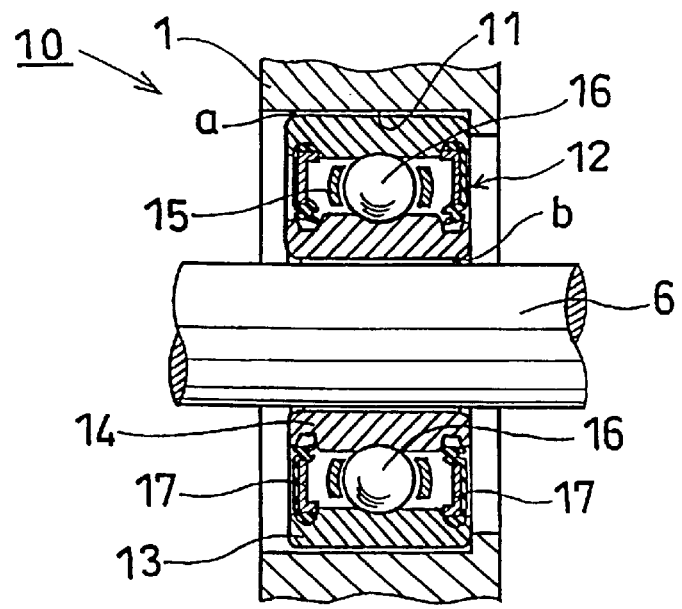
FIG. 3 is a sectional view showing the structure of a prior art bearing device applied to bearing for a throttle valve of a vehicle engine carburetor.

FIG. 1 shows a bearing device in accordance with the present invention. The present bearing device 10 is applied for the vehicle engine carburetor shown in FIG. 2, and has the same basic mechanism as that shown in FIG. 3. Therefore, the same reference numerals are given to the same portions as the portions shown in FIG. 3, omitting their description. According to the present embodiment, the roller bearing 12, which bears the throttle valve 5 (see FIG. 2) disposed in the intake passage 2 within the intake pipe (housing) 1, includes a line of annular grooves 21 and 22 formed in the outer circumferential surface of the outer race 13 thereof and the inner circumferential surface of the inner race 14 thereof, respectively, at the intake passage (fluid passage) 2 side within the intake pipe 1. The bearing 12 also includes O-rings (seal rings) 23 and 24 engagingly arranged on the interior of the annular grooves 21 and 22, respectively. The roller bearing 12 is fitted into the coupling bore 11 in the intake pipe 1 via the O-ring 23 at its outer race 13 side while the shaft 6 of the throttle valve 5 is engagingly received by roller bearing 12 via the O-ring 24 at the inner race 14 side.

With the so constructed bearing device 10, the clearance a or b that may occur between the outer race 13 of the roller bearing 12 and the inner surface of the coupling bore 11 in the intake pipe 1 or between the inner race 14 of the roller bearing 12 and the shaft 6 of the throttle valve 5 due to a dimensional error, difference in thermal expansion, etc. may be eliminated by the O-rings 23 and 24 which are made of an elastic material. As a result, air as well as impurities such as water, oil or grease may be avoided from permeating into the intake passage (fluid passage) 2 within the intake pipe 1. The O-rings 23 and 24 also contribute to the prevention of creep (slippage) or absorption of vibration noise. Therefore, a smooth operation of the throttle valve 5 is ensured.

While the single O-rings 23 and 24 are arranged on the outer race 13 and the inner race 14 of the roller bearing 12, respectively, in the present embodiment, the number of O-rings 23, 24 is at discretion. It is to be understood that two or more O-rings may be arranged. The material of the O-rings 23 and 24 may be also freely selectable, and it may be rubber or plastic.

Further, according to the present embodiment, the annular grooves 21 and 22 are respectively formed in the outer race 13 and the inner race 14 of the roller bearing 12 so that the O-rings 23 and 24 can be engagingly arranged on the roller bearing 12. As an alternative, an annular groove may be formed on the inner surface of the coupling bore 11 in the intake pipe 1 or on the shaft 6 of the throttle valve 5 on which an O-ring may be engagingly arranged.

As has been described, according the bearing device of the present invention, the seal ring made of an elastic material is reliable to prevent any material or fluid from moving between the fluid passage within the housing and the outside of the housing even though any clearance occurs in the engaged sections between the roller bearing and the fluid system housing and between the roller bearing and the shaft of the rolling element due to a dimensional error, difference of thermal expansion, etc. Therefore, the bearing device according to the present invention is advantageous to bear the rolling element disposed in the fluid passage wherein pressure difference is generated between the inside and the outside of the housing.

What is claimed is:

1. A bearing device having a rolling bearing equipped with seals which is fitted into a coupling bore in the wall of a fluid system housing, said fluid system having therein a fluid passage causing pressure difference between inside and outside of the housing, in which said roller bearing bears a shaft of a rolling element disposed in the fluid passage, wherein said roller bearing includes at least one annular groove in the outer circumferential surface of the outer race thereof and the inner circumferential surface of the inner race thereof, and a seal ring made of an elastic material is engagingly arranged on the interior of each of said at least one annular groove to attain sealing effect between the outer race and the inner surface of the coupling bore in the housing and between the inner race and the shaft of the rolling element.

2. A bearing device as claimed in claim 1, wherein the fluid system housing is in form of a vehicle engine intake pipe having therein an intake passage, and the rolling element is a butterfly valve.

3. A bearing device as claimed in claim 2, wherein the butterfly valve is a throttle valve.

4. A bearing device as claimed in claim 2, wherein the butterfly valve is a choke valve.

* * * * *